US012179452B2

(12) United States Patent
Garris et al.

(10) Patent No.: US 12,179,452 B2
(45) Date of Patent: Dec. 31, 2024

(54) METHOD AND APPARATUS FOR POUCH MAKING

(71) Applicant: CMD Corporation, Appleton, WI (US)

(72) Inventors: Charles A. Garris, Appleton, WI (US); Paul A. Selle, Appleton, WI (US); Timothy Blane Lewis, Neenah, WI (US); Christopher Lee White, Watersmeet, MI (US); Peter Todd Hunnicutt, Greenville, WI (US)

(73) Assignee: CMD Corporation, Appleton, WI (US)

( * ) Notice: Subject to any disclaimer, the term of this patent is extended or adjusted under 35 U.S.C. 154(b) by 0 days.

(21) Appl. No.: 17/020,040

(22) Filed: Sep. 14, 2020

(65) Prior Publication Data

US 2020/0406571 A1 Dec. 31, 2020

Related U.S. Application Data

(63) Continuation of application No. 15/595,894, filed on May 15, 2017, now Pat. No. 11,220,081.
(Continued)

(51) Int. Cl.
*B31B 70/00* (2017.01)
*B31B 70/64* (2017.01)
(Continued)

(52) U.S. Cl.
CPC .......... *B31B 70/005* (2017.08); *B31B 70/006* (2017.08); *B31B 70/642* (2017.08);
(Continued)

(58) Field of Classification Search
CPC ... B31B 70/005; B31B 70/645; B31B 70/642; B31B 70/006; B31B 70/76; B31B 70/62;
(Continued)

(56) References Cited

U.S. PATENT DOCUMENTS

| | | | | |
|---|---|---|---|---|
| 3,147,168 A * | 9/1964 | Bateman | ............... B31B 70/642 | 493/193 |
| 3,953,272 A * | 4/1976 | Webber | ............... B29C 65/7847 | 156/499 |

(Continued)

OTHER PUBLICATIONS

Trak, the Intelligent Track System, Publication MOTION-BR007A-EN-P, Jul. 2015, Rockwell Automotion, Milwaukee, WI.

(Continued)

*Primary Examiner* — Gloria R Weeks
*Assistant Examiner* — Mobeen Ahmed
(74) *Attorney, Agent, or Firm* — Andrus Intellectual Property Law, LLP

(57) ABSTRACT

A method and apparatus for making bags or pouches is disclosed. It includes a track, at least two sleds that move on the track, and operating stations mounted on the sleds. The film moves along the track, and the sleds move with the film while performing operations on the film. The system can have the sleds stationary while operating for an intermittent machine, and move to reconfigure when the film is moving. The operating stations include one or more of a sealer, a heater, a cooler, an inserter, a knife, a punch, a perforator, a static charger, and a printer. The track forms a continuous path or is linear. A controller controls the sleds and operating stations. The controller includes an operating time and/or a reconfiguration module. The operating time module is responsive to a user set material thickness or a sensed material thickness.

10 Claims, 6 Drawing Sheets

Related U.S. Application Data

(60) Provisional application No. 62/337,194, filed on May 16, 2016.

(51) Int. Cl.
*B31B 70/14* (2017.01)
*B31B 70/62* (2017.01)
*B31B 70/74* (2017.01)
*B31B 70/88* (2017.01)
*B31B 155/00* (2017.01)
*B31B 160/10* (2017.01)

(52) U.S. Cl.
CPC .......... *B31B 70/644* (2017.08); *B31B 70/645* (2017.08); *B31B 70/648* (2017.08); *B31B 70/14* (2017.08); *B31B 70/62* (2017.08); *B31B 70/76* (2017.08); *B31B 70/88* (2017.08); *B31B 2155/002* (2017.08); *B31B 2160/10* (2017.08)

(58) Field of Classification Search
CPC ..... B31B 2160/10; B31B 70/14; B31B 70/88; B31B 2155/002; B31B 70/64; B31B 70/644; B31B 70/648
USPC ....... 493/189, 190, 191, 195, 197, 199, 200, 493/201, 202, 203, 205, 207, 208
See application file for complete search history.

(56) References Cited

U.S. PATENT DOCUMENTS 4,300,893 A * 11/1981 Achelpohl ............ B31B 70/642 493/204
4,307,555 A * 12/1981 Mlodozeniec ....... A61K 9/2095 53/553
4,761,934 A * 8/1988 Lancaster ............ B65B 11/025 53/399
5,058,364 A * 10/1991 Seiden .................. B65B 43/123 53/562
5,289,668 A * 3/1994 Meyer ................... B65B 13/181 53/410
5,353,573 A * 10/1994 Durrant ..................... B65B 3/02 53/64
5,552,013 A * 9/1996 Ehlert ................. B29C 66/1122 156/580.2
5,588,944 A * 12/1996 Achelpohl .......... B29C 66/8242 493/205
5,699,653 A * 12/1997 Hartman ................. B65B 9/087 53/562
5,715,645 A * 2/1998 Fukuda ............. B29C 66/91653 53/374.6
5,761,889 A * 6/1998 Blaisdell ............... B60R 21/237 53/529
5,873,214 A * 2/1999 Moore .................. B65B 11/025 53/399
5,967,961 A * 10/1999 Leijon ................. B29C 66/4312 493/208
6,050,061 A * 4/2000 Todd ....................... B65B 5/022 53/562
6,195,967 B1 * 3/2001 Todd ....................... B65B 43/04 53/329.2
6,247,293 B1 * 6/2001 Todd ..................... B29C 66/431 53/329.2
6,363,689 B1 * 4/2002 Rodriguez ............. B65B 27/12 53/399
6,454,890 B1 * 9/2002 Couillard .......... B29C 66/73921 156/580.2
6,481,183 B1 11/2002 Schmidt
6,547,903 B1 * 4/2003 McNichols ......... B29C 66/8246 156/580.2
6,561,962 B1 * 5/2003 Engelhart ............... B31B 70/00 493/197
6,688,084 B2 * 2/2004 Yarbrough .............. B65B 13/02 53/589
6,732,496 B1 * 5/2004 Wessman ............. B65B 51/227 53/64
6,817,160 B2 11/2004 Schmidt
8,029,428 B2 10/2011 Selle et al.
8,128,546 B2 * 3/2012 Dytchkowskyj ........ B31B 70/00 493/212
8,282,538 B2 * 10/2012 Paunesku ................ B65B 43/04 493/193
8,616,134 B2 * 12/2013 King ...................... B65G 35/06 104/284
9,254,632 B2 2/2016 Hunnicutt et al.
9,611,107 B2 * 4/2017 Wernersbach ....... B65G 47/648
9,688,043 B2 * 6/2017 Lin ......................... B31B 70/00
9,802,507 B2 * 10/2017 Clark ...................... B60L 13/10
10,308,446 B2 * 6/2019 Spotti .................... B65G 37/02
10,442,637 B2 * 10/2019 Huang ................... B65G 54/02
2002/0029540 A1 * 3/2002 Lancaster, III ....... B65B 11/008 53/399
2002/0058574 A1 * 5/2002 Sauder .................. B31B 70/006 493/269
2003/0136086 A1 * 7/2003 Kalany .................. B65G 47/52 53/251
2003/0230941 A1 * 12/2003 Jacobs ................. B65G 47/841 310/12.19
2004/0026029 A1 * 2/2004 Martin ............. B29C 66/91655 156/499
2004/0082455 A1 4/2004 Winiecki et al.
2005/0003941 A1 * 1/2005 Wied .................... B31B 70/005 493/213
2005/0034820 A1 * 2/2005 Schneider ......... B29C 66/92613 156/580.2
2005/0198920 A1 * 9/2005 Nakagawa .............. B65B 57/00 53/64
2007/0017189 A1 * 1/2007 Konno ............. B29C 66/81427 53/551
2007/0091171 A1 * 4/2007 Winiecki ............ B29C 65/7894 348/96
2007/0180794 A1 * 8/2007 Paunesku ................ B65B 43/04 53/562
2007/0204564 A1 * 9/2007 Lancaster, III ......... B65B 57/04 53/399
2007/0204565 A1 * 9/2007 Lancaster, III ....... B65B 11/025 53/399
2010/0236445 A1 * 9/2010 King ....................... B60L 13/10 104/130.03
2011/0167772 A1 * 7/2011 Piucci, Jr. ............ B29C 66/836 53/329.2
2011/0207589 A1 * 8/2011 Moran ................ B29C 66/8322 493/267
2012/0102881 A1 * 5/2012 Moore .................. B65B 11/045 53/399
2012/0118470 A1 * 5/2012 Dittmer ................. B29C 66/853 156/367
2012/0281934 A1 * 11/2012 Dytchkowskyj ... B65D 33/2525 383/63
2012/0289389 A1 * 11/2012 Murray ................. B31B 70/006 493/193
2012/0289391 A1 * 11/2012 Murray ..................... B65B 1/02 493/227
2012/0311975 A1 * 12/2012 Kamigaito ........ B29C 66/81431 53/548
2013/0074724 A1 * 3/2013 King ..................... B60L 15/005 104/130.02
2014/0094353 A1 * 4/2014 Murray ................... B31B 70/64 493/6
2014/0174027 A1 * 6/2014 Cere' .................... B65B 11/025 53/203
2014/0208696 A1 * 7/2014 Phillips ................... B65B 41/12 53/461
2014/0298760 A1 * 10/2014 Luo ......................... B65B 61/06 53/588
2015/0083018 A1 3/2015 Clark
2015/0217887 A1 * 8/2015 Jacobs ................... B65G 37/00 414/801

(56) References Cited

U.S. PATENT DOCUMENTS

| | | | | |
|---|---|---|---|---|
| 2015/0259087 | A1* | 9/2015 | Schwartz | B65H 81/06 53/556 |
| 2015/0273780 | A1* | 10/2015 | Hintraeger | B65B 57/04 53/64 |
| 2017/0157881 | A1* | 6/2017 | Kropf | B31B 70/642 |
| 2017/0355476 | A1* | 12/2017 | Kim | B65B 57/14 |
| 2019/0091941 | A1* | 3/2019 | Uttaro | B29C 66/8412 |

OTHER PUBLICATIONS

Trak, the Intelligent Track System, Publication MOTION-BR007A-EN-P, Jul. 2015, Rockwell Automation, Milwaukee WI.

Definition of 'bag', Collins English Dictionary, 15 pages, https://www.collinsdictionary.com/dictionary/english/bag, accessed Jul. 13, 2023.

Definition of 'pouch', Collins English Dictionary, 10 pages, see https://www.collinsdictionary.com/dictionary/english/pouch, accessed Jul. 13, 2023.

* cited by examiner

METHOD AND APPARATUS FOR POUCH MAKING

CROSS-REFERENCE TO RELATED APPLICATIONS

This application is a continuation of U.S. application Ser. No. 15/595,894, filed May 15, 2017, which claims priority to U.S. Provisional Application Ser. No. 62/337,194, filed May 16, 2016, which are hereby incorporated by reference herein.

FIELD OF THE INVENTION

The present disclosure relates generally to the art converting a film or web. More specifically, it relates to making bags or pouches using sealers to seals at least two layers of film or web to form a bag or pouch.

BACKGROUND OF THE INVENTION

There are many known pouch and bag machines. Some prior art machines are continuous motion machines and some are intermittent machines. Continuous motion machines move the web at a constant speed and the various operations are performed as the web moves. Bag or pouch machines can create a seal as the web is moving using a rotary drum or a shuttle.

Examples of 760-PPS intermittent motion machines includes the CMD® 760-C machine and 760-PPS machines and examples of continuous motion machines includes the CMD® 1270GDS and 1552ED machines. Intermittent motion machines are described in U.S. Pat. No. 9,254,632 and US20040082455 A 1, and continuous motion machines are described in U.S. Pat. No. 8,029,428, all of which are hereby incorporated by reference. Bag or pouch machines often perform a variety of operations on the web to create the bag or pouch. Examples of the operations and types of devices that perform the operation includes forming seals using sealers, heating performed by heaters, cooling performed by coolers, applying an insert (such as a zipper, e.g.) by an inserter, cutting by a knife or cutter, hole punching with a punch, forming perforations using a perforator or knife, melting using a heater, inducing static using a charger, reducing static, printing or marking using a printer. Depending on the application a number of these operations are performed using a number of devices. Some operations includes multiple sub-operations performed using multiple devices—sealing might includes several seals each formed by a unique sealer. Some of these operations take longer to perform than other operations, and/or the time can vary based on material thickness, material type, and the particular application.

A rotary drum machines forms seals by moving the web around a drum that includes seal bars. The film contacts the seal bars, and the drum rotates at a speed such that the speed of the seal bar matches the speed of the film, so there is no relative motion of the film to the seal bar. Thus the forming of the seal appears to be done without movement. The drum diameter and web speed determine the length of time the film is in contact with the seal bar.

A shuttle machine includes a sealer mounted on a shuttle. The sealer contacts a moving film at a starting position and the shuttle moves with the film, thus there is no motion of the seal bar relative to the film, and the forming of the seal appears to be done without movement. After the seal is formed the shuttle reverses direction and moves quickly to return to the starting position where it will contact the film to form the next bag or pouch. The time it takes to form the seal and the time it takes to return to the starting position limit the machine speed. Each operation being performed has its own station, and as the film progresses through the machine the operations combined to form a bag or pouch. Shuttle machines tend to have a lengthy foot print because each operation (or sub-operation) requires a station and/or shuttle, and time consuming operations require a greater distance (and a greater shuttle travel) to be completed.

Intermittent motion machines move the film, and then stop the film and an operation is performed. For example, while the film is stopped a sealer forms a seal. The film is then advanced and again stopped so that a subsequent operation can be performed at a subsequent station. Each operation being performed has its own station, and as the film intermittently progresses through the machine the operations combine to form a bag or pouch. When the web or film is stopped all of the tools act. Thus, the slowest operation limits the speed of the film. Also, the footprint of an intermittent motion machine must be long enough to accommodate all stations.

Starting and stopping the web can cause difficulties, often because the web is extensible material which can behave like a spring of sorts. Webs typically present complex physics, dynamics, aerodynamics, nonlinear mechanical deformations, Newtonian and non-Newtonian fluid behaviors. Some of the challenges are compounded during operations that add or remove heat. Other challenges occur when additional components or webs are added or joined to the main web or to one another. If a zipper is introduced on one side of the web, the web is now a symmetric, which will further compound the challenges associated with moving the web accurately and precisely where it is needed for subsequent operations during the process sequences.

Prior art continuous and intermittent motion machines are limited in their flexibility to switch between different applications (bag or pouch type, material used, numbers of seals made, etc.) because each station must be coordinated with the other stations for speed and time needed for performing the operation.

Accordingly, a bag or pouch machine that allows for a smaller footprint and/or more flexibility is performing operations is desirable.

SUMMARY OF THE PRESENT INVENTION

According to a first aspect of the disclosure a machine to convert a film into a plurality of objects includes, a track, two sleds that move on the track, and two operating stations, each mounted on a sled. The film moves from an infeed section along the track, and the first operating station moves with the film while performing a first operation on the film. The second operating station also moves with the film while performing the a second operation on the film.

According to a second aspect of the disclosure a method of converting a film into a plurality of objects includes moving a first sled and operating station on a track, and moving a second sled and operating station on a track. A first operation is performed on the film by the first operating station as the first operating station moves with the film. A second operation is performed on the film by the second operating station as the second operating station moves with the film.

According to a third aspect of the disclosure a machine to convert a film into a plurality of objects includes a track, a plurality of sleds that moves on the track, a plurality of operating stations and a controller, connected to control the movement of the plurality of sleds. Each of the operating stations are mounted on at least one of the sleds, and each of the operating stations perform at least one operation on the film. The film moves intermittently along the track. The controller includes a configuration module that is not active when the film is not moving.

The machine produces pouches or bags, and one operating station includes a sealer in one alternative.

The second operating station includes at least one of a second sealer, a heater, a cooler, an inserter, a knife, a punch, a perforator, a static charger, and a printer in another alternative.

The track forms a continuous path such that the first and second sleds can travel around the entire path and begin a second pass around the path without needing to reverse directions in one embodiment, and is linear in another embodiment.

The machine includes additional sleds that move on the track with the film and a plurality of additional operating stations, each of which is mounted on and moves with one of the plurality of additional sleds in various embodiments.

A controller is connected to the first operating station and the second operating station in one alternative.

The first operation requires a first duration to complete, and the controller includes an operating time module connected to the first operating station and responsive to the first duration in another alternative.

The controller receives a user set material thickness or a sensed material thickness, and the controller includes an operating time module connected to the first operating station and responsive to the user set or sensed material thickness in various embodiments.

Other principal features and advantages of will become apparent to those skilled in the art upon review of the following drawings, the detailed description and the appended claims.

Figure 1:
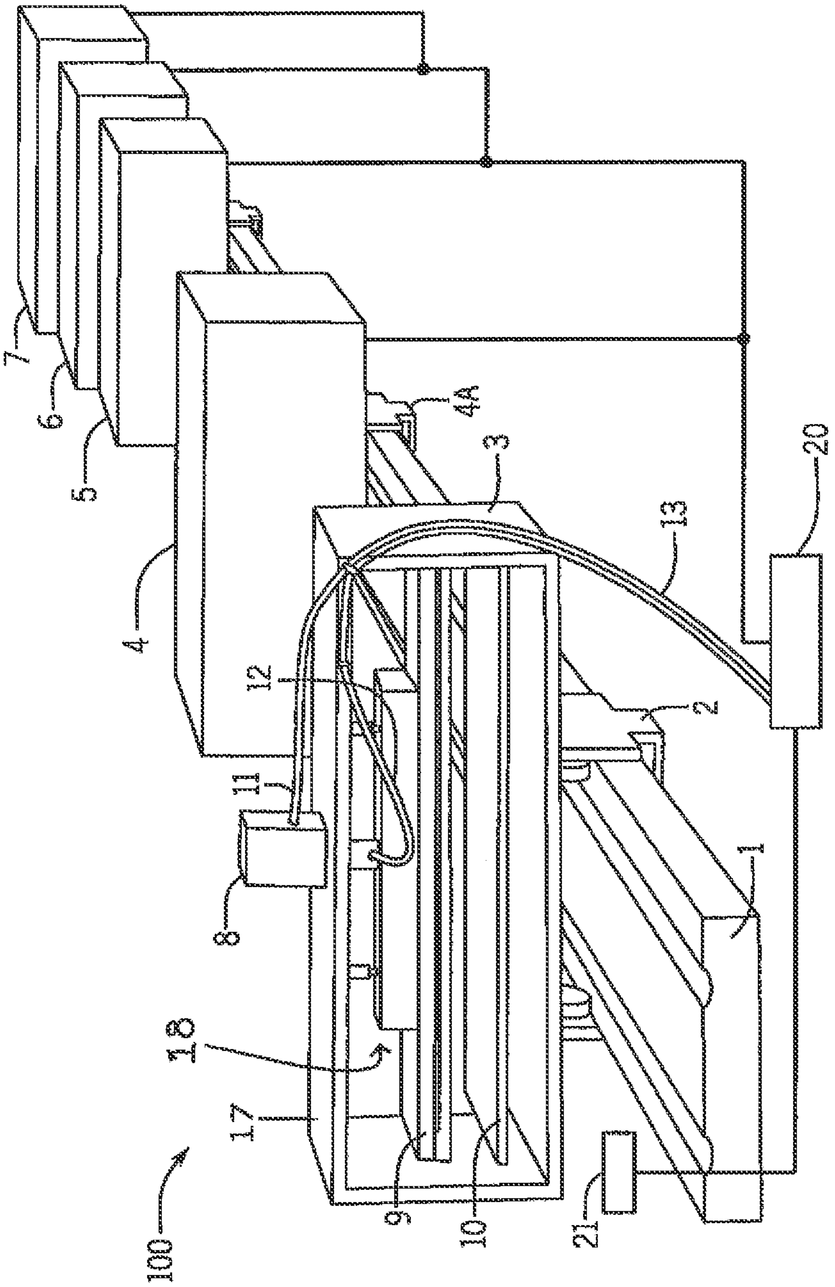
FIG. 1 is a diagram of a system for converting.

Before explaining at least one embodiment in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present disclosure will be illustrated with reference to particular machines and tracks, it should be understood at the outset that the invention can also be implemented with other converting machines and other tracks.

Generally the invention is a machine or method to convert a film into a plurality of objects using a track and at least two sleds that move on the track. Each sled has at least one operating station mounted thereon, such that the operating station moves with the sled. Each operating station performs a second operation on the film while the sled and operating station move with the film. Thus, while the operation is being performed there is not overall relative movement of the operating station with respect to the film. (A portion of the operating station may move relative to the film, such as the seal bar moving, but the overall station does not move relative to the film). Sled, as used herein, refers to a device that travels on a track, and can be self propelled such as by servo drive wheel, or externally propelled, such as by magnets. Operating station, as used herein, refers to a station that performs one or more operations on a film or web using a web processing tool such that the operating station is one of a sealer, a heater, a cooler, an inserter, a knife, a punch, a perforator, a static charger, and a printer. The tools can be passive (such as a backing die or hot bar) or active (such as a punch or heated device.) Moves with the film, as used herein, refers to an operating station or sled traveling in the same direction and at the same speed as the film or web.

According to various embodiments the operating station travels in the same direction as the web direction while the web processing devices are activated on the web. Each operating station is independently controlled with respect to its position and speed (during the web processing and during its return path). Each station is independently controlled with respect to its position and speed such that the normal distance between stations (one bag repeat length) is no longer required so the floor space requirement for each station is greatly reduced. Each station is independently controlled by a variety of selectable preset programs for various repeat lengths, various tools, various devices, and various web speeds. Each station is independently controlled and can be on a variety of shaped tracks such as linear, round, oval, elliptical, french curved, s-curved, arcuate, serpentine, hot dog shaped, or combinations thereof. Each station is independently controlled and by using one or more upper one directional (hot dog shaped) tracks to hold the upper half of each station and one or more lower one directional track to hold the lower half of each station in one embodiment (described with respect to FIG. 3, below). Devices on the station may be activated/extended/retracted at any point along the track Each station is independently controlled and by using two linear bi-directional tracks (one above the web and one below) where each track carries half of a station in one embodiment. Each station is independently controlled and by using four linear tracks (two above the web path and two below the web path) where the two upper tracks carry the upper half of a station and the lower two tracks carry the lower half of a station in another embodiment. This embodiment allows smaller tracks and sleds to be used or less robust cross bars to be used or heavier stations to be moved or faster speeds to be obtained. Preferably the machines described incorporate the CMD patent pending "Zipper Crush" technology or CMD Patent 6481183 technology or CMD Patent 6817160 technology.

Another embodiment may generally be seen in FIG. 1, where a machine 100 includes a track 1, a first sled 2 carrying a first operating station 3, and a second sled 4A carrying a second sled 4. Operating station 3 is a sealer. A film (not shown) is moved along track 1, and while operating station 3 is forming the seal, sled 2 moves with the film so that there is not relative movement between the seal bar and the film while the seal bar is contacting the film and forming the seal. Sealer, as used herein, refers to a device that uses pressure and/or heat to seal layers of a web or film.

Various embodiments provide that the machine produces bags or pouches, and that the operating stations are from the group of sealers, heaters, coolers, inserters, knives, punches, perforators, static chargers, and printers (markers). Additional operating stations 4, 5, 6, and 7 are shown in FIG. 1, and in the preferred embodiment are operating station 4 is a sealer, operating stations 5 is a heater, operating stations 6 is a cooler, operating stations 7 is an inserter. Other embodiments use different types of operating stations. Operating stations 4-7 are each mounted on an additional sled that moves on the track with the film, such that as they operate there is no relative motion between operating stations 4-7 and the film. In certain examples, the operating station includes a frame 17 and a passageway 18.

Figure 2:
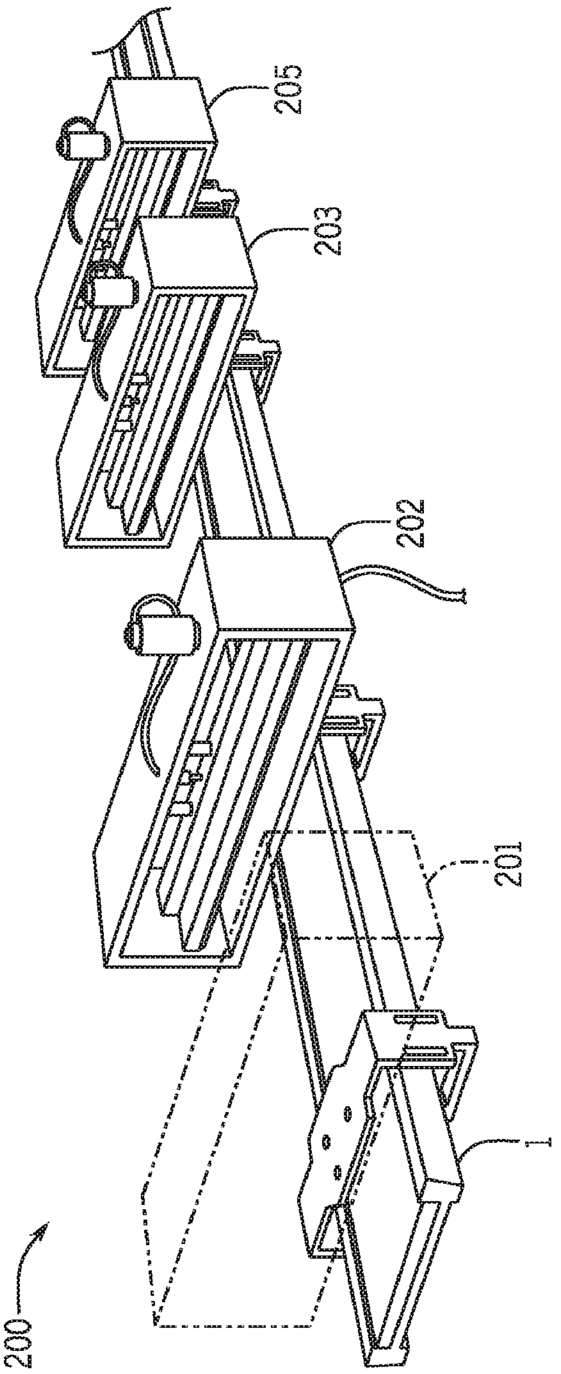
FIG. 2 is a diagram of a system for converting.

FIG. 2 shows a system 200 with track 1 and operating stations 201-205. Operating station 201 is a knife or punch, operating station 202 is a perforators, operating station 203 is a static charger, and operating station 204 is a printer (marker). Other embodiments use different types of operating stations.

Heater, as used herein, refers to a device that applies heat to a web or film. Cooler as used herein, refers to a device that cools a web or film. Inserter, as used herein, refers to a device that inserts something, such as a draw tape, into a pouch or bag being formed from a web or film. Knife, as used herein, refers to a device that cuts or perforates a web or film (or bag or pouches). Punch, as used herein, refers to a device that punches a hole in a web or film (or bag or pouches). Static charger, as used herein, refers to a device that applies a static charge to a web or film (or bag or pouches). Printer, as used herein, refers to a device that marks or prints on a web or film (or bag or pouches).

Figure 3:
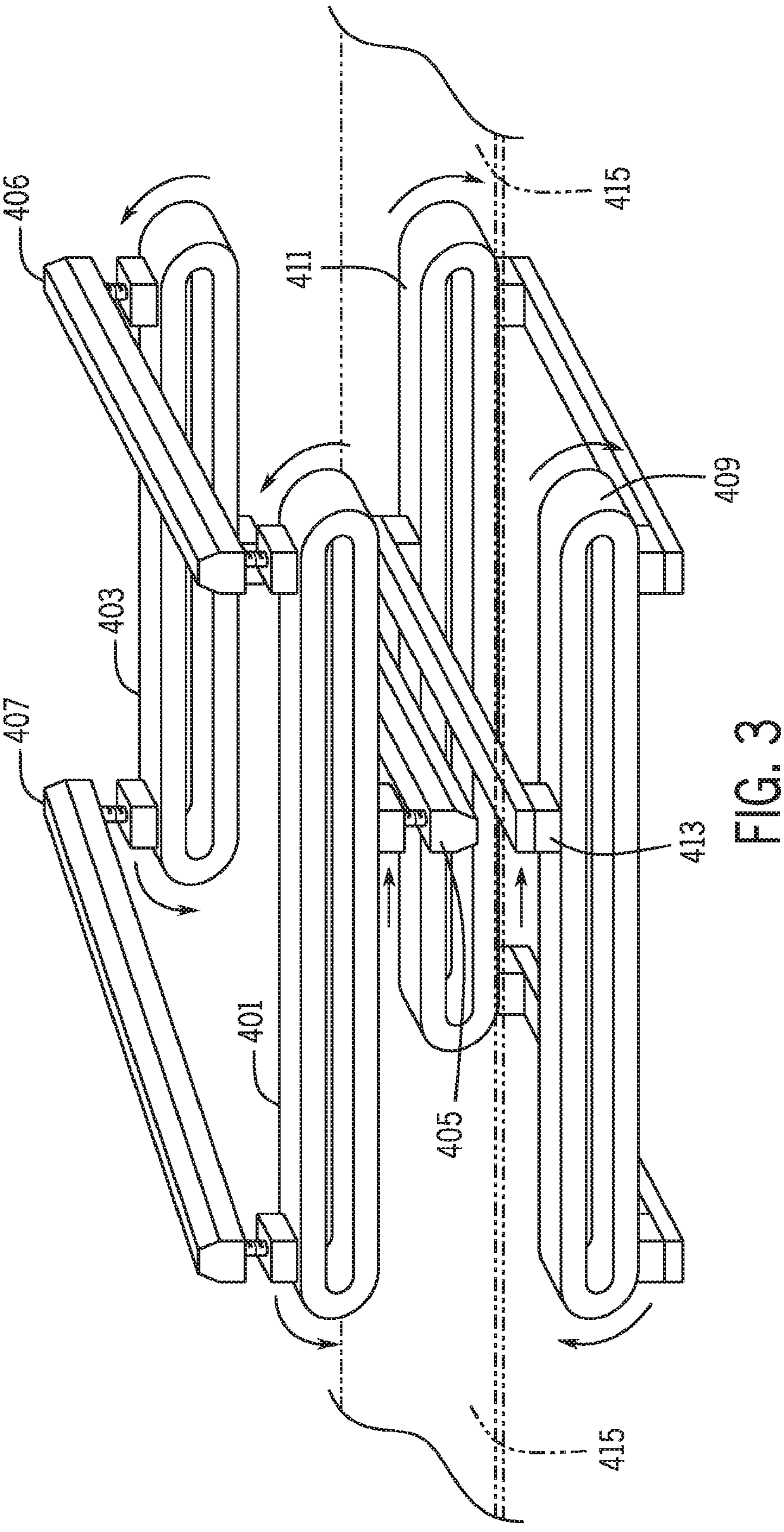
FIG. 3 is a diagram of a system for converting.

Track 1 is only partially shown, and in one embodiment forms a closed loop such that sleds 2 and 4A can move entirely around track 1 without reversing directions. In another embodiment track 1 is linear and does not form a closed loop. FIG. 3 shows an embodiment with a continuous track. Two upper tracks 401 and 403 support operating stations/seal bars 405, 406 and 407. Two lower tracks 409 and 411 support operating station/backing die 413. A film 415 is shown in phantom by dashed lines, and moves between the tracks. Operating station/die backing 413 provides the backing for seal bars 405-407. Two upper and two lower tracks are used in this embodiment to support the weight of operating stations 405-407 and 413.

Operating stations 405-407 and 413 move with film 415 (at the film speed) when the seal is being formed. Operating stations 405-407 move at a desired speed along the top portion of tracks 401 and 403 when the seal is not being formed to return to the starting position (where they are ready to begin traveling with the web again to form another seal). Only one die backing 413 is shown, so in this embodiment operating station 413 moves very quickly after the seal is formed to be back at the starting position for forming the next seal. Other numbers of operating stations can be provided, and their speed is controlled such that they follow the film when operating, and travel fast enough when not operating to be ready for the next time they are needed to operate. Given that there are three seal bars, each bar 405-407 forms seals on every third pouch or bag.

Additional seals are performed and additional operations are performed using additional tracks and sleds that are downstream along the film path in the preferred embodiment Each track can have one or more sleds with operating stations mounted thereon.

A controller having two portions 8 and 20 is connected to the first and second operating stations. The control connections can be hard wired or wireless. The power connections are hard wired. The controller can be in one location, or distributed as shown by controller portions 8 and 20. Controller 8 and 20 controls movement of the sleds. The sleds can be moved using servos, magnetics, or other motors, including linear motors. Controller, as used herein, refers to hardware and/or software that cooperates to control a device such as a sled and/or operating station, and a controller can be in one location or distributed among numerous locations.

Controller 8 and 20 use the duration of time needed to complete a seal to insure that seal bar 9 is in contact with the film for the proper length of time. Controller portion 8 is an operating time module and is connected to operating station 3 and responsive to the duration of time needed to seal the film. Operating time module, as used herein, is a control module that controls the time an operating station operates on the film or web in response to an input to the operating time module. Module, as used herein, refers to a portion of a controller that controls a specific function and can be hard ware and/or software.

Controller 8 and 20 receives a user set material thickness via cable 13, and operating time module 8 is responsive to the user set material thickness in the preferred embodiment. User set material thickness, as used herein, refers to a setting made by a user (local or remote) that describes the thickness of the film or web being converted.

Another embodiment provides that a material thickness sensor 21 is disposed near the film and provides a material thickness signal to controller 20. Operating time module 8 is responsive to the material thickness signal. Material thickness sensor, as used herein, refers to a sensor that detects the thickness of the film or web being converted, such as by tension, pressure, rf signal, etc. Material thickness signal, as used herein, refers to a signal that indicates or is responsive to material thickness.

The method of converting a film into a plurality of objects preferably includes moving sled 2 on track 1 while operating station 3 is mounted thereon such that it moves with the sled 1. Operating station 3 performs an operation, such as forming a seal, on the film as it moves with the film. Sled 4A is also moved on track 1 while operating station 4 is mounted thereon such that it moves with sled 4A. Operating station 4 performs an operation on the film as it moves with the film. The method preferably forms at least one of a pouches and bags, and operating station 3 forms a seal.

Operating station 4 preferably performs one of forming a seal, heating, cooling, inserting, cutting, punching a hole, perforating, applying a static charge, and marking.

Another embodiment provides that system 1 is an intermittent motion machine such as a pouch machine. Film 415 (FIG. 4) is indexed, and then stopped. While film 415 is stopped operating stations 4-7 (or 405-407) operate on the film. In this embodiment the sleds do not move while the pouch is being formed. The sleds are stationary while pouches are being formed, but they can move to reconfigure for a different application (pouch design) when the film or web is moving. Controller 20 includes a configuration module that is active when the film is moving and a reconfiguration is called for. Configuration module, as used herein, refers to a control module that positions sleds or operating stations at a desired location on the track to perform a desired operation to produce a desired product. A configuration module is active when it is configuring the sleds or operating stations, and is inactive when the sleds or operating stations are not being configured.

This allows for very easy set-up without having any down time by having the operating stations automatically reconfigure while the web is indexing, by moving the sleds to a desired location in response to the user or a program selecting a different pouch design. The tools/operating stations can move back and forward to various positions to perform operations on the web or multiple webs, as long as the tools are moved to the appropriate positions during the time that the web indexed (moved). Thus, an intermittent pouch machine using this design can be reconfigurable without shutting down. The track can be linear or closed loop in this embodiment. The operating stations can perform the operations described above and below. The operating time module controls the operating stations to act for the duration needed in response to a user set material thickness and/or a material thickness sensor that provides a material thickness signal.

Figure 4:
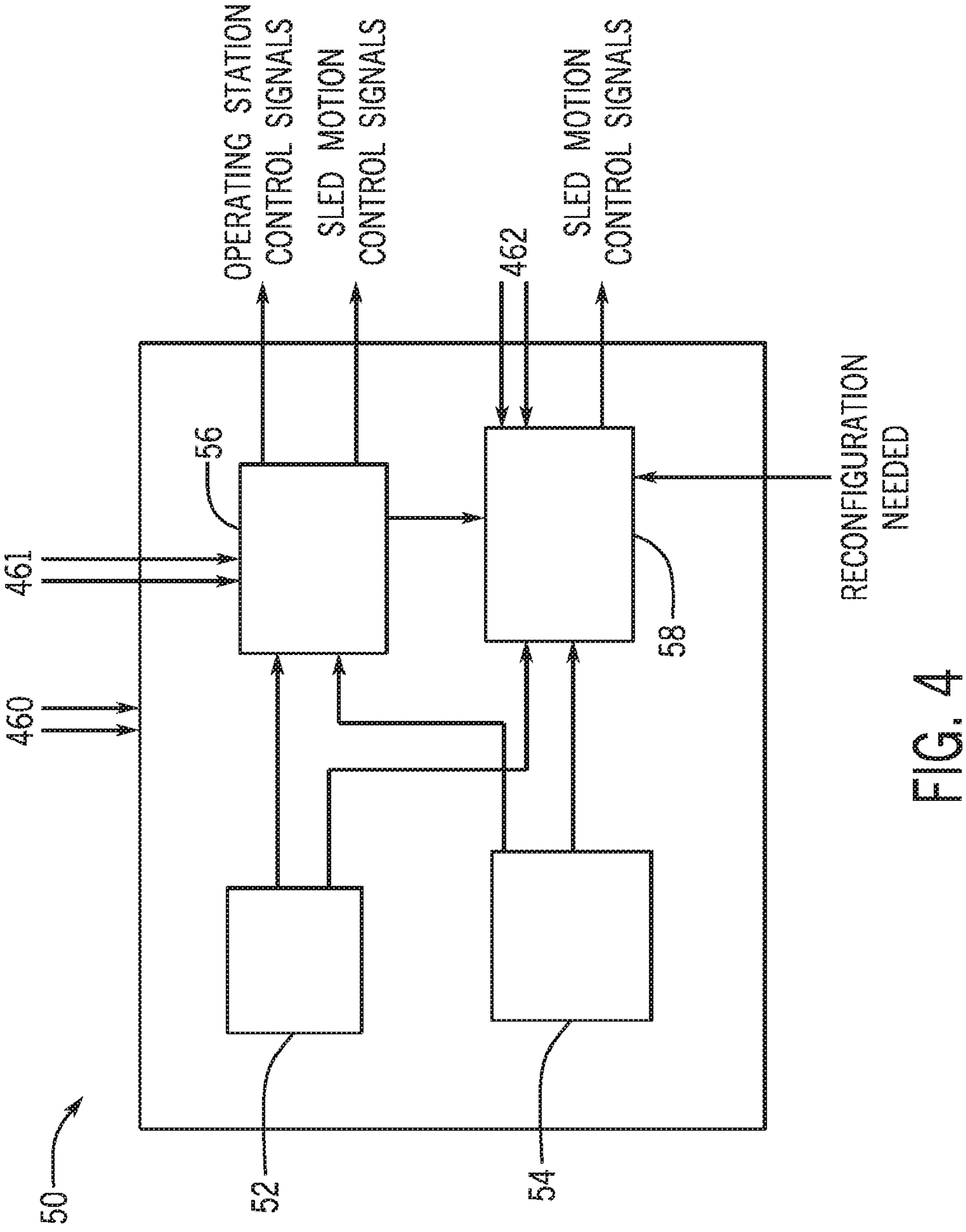
FIG. 4 is a diagram of a controller for a system for converting.

A controller 50 that can implement the intermittent embodiment and the continuous motion embodiment is shown in FIG. 4, and includes a user set material thickness module 52, a material thickness sensor module 54, an operating time module 56 and a configuration module 58 (which can be omitted in a continuous motion embodiment). Modules 52 and 54 provide signals to modules 56 and 58 that indicate the thickness of the film or web. In response operating time module 56 provides control signals to the operating stations so that they operate the appropriate length of time. In a continuous motion embodiment operating time module 56 also provides control signals to the sleds so that they move to match the film speed and so that the move the appropriate distance for the operation to be completed. Operating time module 56 provides "in operation" signals to configuration module 58 indicating when the operations are and are not being performed in the intermittent embodiment. In response to the material thickness signals and/or the in operation signals, configuration module 58 moves the sleds to the newly desired configuration when a reconfiguration is needed (for example according to a preset program or when the operator calls for one) and when the film or web is moving.

Feedback and/or other information can be provided from the operating sleds and operating stations on signal carriers 460 to controller 50. The feedback can be of such information as position, speed, temperature, etc. Feedback and/or other information can be provided from the operating sleds and operating stations on signal carriers 461 to operating time module 56. The feedback can be of such information as position, speed, temperature, time etc. Feedback and/or other information can be provided from the operating sleds and operating stations on signal carriers 463 to configuration module 58. The feedback can be of such information as position, speed, temperature, time, type of tool etc.

Both the continuous motion and intermittent motion embodiments include a system for performing functions on the web, or executing value-added steps in the course of processing web based materials such as woven or nonwoven films, fabrics, and multilayer laminates (the web can consists of at least two layers—each layer may be mono-layer or multi-layered) which may or may not contain foils or metallic constituents and where the films are most commonly single or multiple layered structures, including polyester or poly propylene or polyethylene. The system can be a pouch or bag machine, for example.

The machine concept enables a system of sealers, cutters and punchers or other value added features to operate on the web with independent control of the tool's position, velocity, acceleration, and jerk at any point with respect to time or location relative to the material flowing through the machine. The system has a plurality of sleds traveling along a rail or track system, where each sled would carry a station that has at least one tool and perhaps more, or multiples sleds are used to carry a single tool (also called an operating station). The motion and operation of each sled is independently controllable. The film can travel at a constant speed, with the sleds tracking the film while performing an operation, and then returning to a starting position to start the operation on the next segment of film.

For example, one sled could carry a station or platform that adds a zipper insert, and operate on the film for a given period of time. Another sled might carry an operating station or platform that adds a seal and operates for a lesser period of time. Thus, the sled (and station) with the insert would track the film for a given distance before returning to its starting position, and the sled (and operating station) with the sealer would track the film for a lesser distance before returning to its home position. Also, the sled with the insert could operate on multiple pouches, or there could be multiple sleds adding inserts, so that the same number of operations are completed by the insert sleds(s) as the seal sled.

The operating station/tool(s) may include heaters, sealers, coolers, clamps, guides, cutters, burners, inspectors, sensors, detectors, prime movers, inserters, play servers, stitchers, measures, or other value adding componentry or tools. The system could be used for making bags and pouches, however it could also be used to produce fabrics, flexible circuits, magazines, cushions, wiring and cable, and other composite laminate structures.

In the embodiment of a pouch machine, the series of sealers are mounted individually on a series of sleds, which would each be independently controlled based on the type of materials and finished product that is desired (the application). The sealers could have profile shapes that are linear, curvilinear, or of some more complex geometry. Sealers would be enabled to move with the web or to remain stationary depending on the nature of the motion, the product, and the timing that is desired.

The sleds automatically position the appropriate tools at the appropriate location for the particular pouch that is desired. The operator could then change from one size of pouches to another, or change recipes as is often described in this industry, and the tools would relocate to their new position automatically. The advantage of the system would be the ease of set up from one pouch product to another pouch products. Set up changes could occur without stopping the machine.

Referring to the FIG. 1, at least one film or web of material (not shown in FIG. 1) travels between sealer 9 and 10 (in a station or platform 3 carried by sled 2), and proceeds to traverse through a series of additional operating stations 4-7. Stations 4-7 could have the value added steps described above, or another configuration as desired. Station 3 has jaws/seal bars 9 and 10 that open and close, applying pressure and temperature differential to the web(s). The actuation motion could happen through a variety of mechanisms, such as cam action, chain drives, transmissions, motors, magnets, actuators, servos, pneumatics, or other displacement mechanism. Station 3, preferably has a pneumatic air cylinder, a linear electrical motor or servo actuator, to actuate the jaws. Cable 12 is a cable that can carry power and control signals. Cables 11 and 12 are bundled into a harness to form cable 13 which can be thought of as an umbilical cord allowing station 3 to move back-and-forth a long track 1, via the sled 2 that moves station 3.

When system 100 is configured as an intermittent system, operating stations 3-7 are moved to predetermined positions based on the machine program, or on a recipe that is created by an operator of the machine for each application.

The intermittent system is particularly well suited for creating bags and pouches of different sizes. One of the current challenges for these users is during the set up or configuration from one pouch size to another pouch size. For example, a trail mix pouch is significantly smaller than many dog food pouches. However, both end-applications could be manufactured on the same piece of equipment. To improve the speed associated with set up times and to improve the repeatability and reproducibility of each set up and to reduce the expertise needed or associated with performing a successful set up, this system is designed to provide automatic tool positioning based on the type or size of pouch or bag that is desired. The machinery concept shown is also capable of performing as the current state of technology would, where stations 3-7 would all actuate in synchronicity and in accordance with a predetermined program each time that the web indexed along its path.

When system 100 is used as a continuous motion machine the process can have variable velocity. For example the web could be accelerated and decelerated without ever fully stopping the web, with a repeating pattern or with a random pattern of motion, again depending on what outcome is desired.

In the preferred embodiment, the web travels at a constant speed because the machinery required to maintain the web tension, position, velocity, acceleration's is less costly. Each tool in operating stations 3-7 performs an operation on the web while moving at the same velocity as the web. The location of the tool and the desired place on the web, where an operation is desired, would be matched. The duration that each tool would be in contact with the web would vary based on the needs of that operation. For example, a sealer may be in contact for a longer period of time then a cooler. Each of these stations can travel in a loop or can go back and forth, moving at the speed of the web and one direction and returning back to repeat its action, at approximately twice its speed so that it could keep up with the desired operations. A tool could contain a system that must move along the web in the direction that the web is traveling, such as an inkjet or a glue dispenser or a knife or a rotary ultrasonic system. If the system had to move along the length of the web, the longitudinal direction, then it's velocity could be greater or lower than the velocity of the web in that embodiment.

Each operating station 3-7 can perform a single operation on the web or film, or they could have multiple repeated operations on the same physical location on a particular part of the web. For example, if station three applied heat to the web for one second and then let go, then as the web moved through the machine station 4 could also apply heat to the same part of the web as station 3 did before it. Later in the process, station 7 could again apply more heat to the same section where stations 3-4 had previously applied heat to the web.

There are seven stations that are shown, however there could be as few as one and as many as are needed. Also, additional tracks could be used. A machine could initially be purchased with a long track 1 and initially a single sled and station. Then, additional sleds and stations could be added as needed at a later time(s). Another alternative would allow the length of track 1 to be increased by adding sections of track, or adding another track. Thus, this design offers ease of upgrading, because the physical installation would have negligible modifications to the existing machinery, the upgrade would be predominantly additive to the existing system. This would reduce the amount of time and expertise required to install an upgrade. The majority of the changes in an upgrade would involve software configuration to account for the additional value adding station. The software in the controller is preferably modular, or object oriented structure, to reduce programming time.

If more stations are present than needed in a process (or to make a product), then the program stages unused sleds in a location that is not preventing the other stations from performing the necessary operations, with the operating station being in a passive mode. For example, stations 3-4 could be performing repeated value-added work on the web that is traversing through them, while stations 5-7 could have the web traversing through them with no operation being performed on the web and with those last three stations remaining stationary and as far removed or out-of-the-way as is possible or necessary. In one embodiment they are on a portion of the track such that the web does not pass there through. The embodiment of FIG. 3, which uses stations above and below the web or film, allows for easy storage of unused stations in an intermittent application. In the embodiment of FIG. 3 the web goes between two operating stations, and in the embodiment of FIG. 1 the web goes through the operating station. Various embodiments provide that the web passes through, between, near, over and/or under operating stations.

Figure 5:
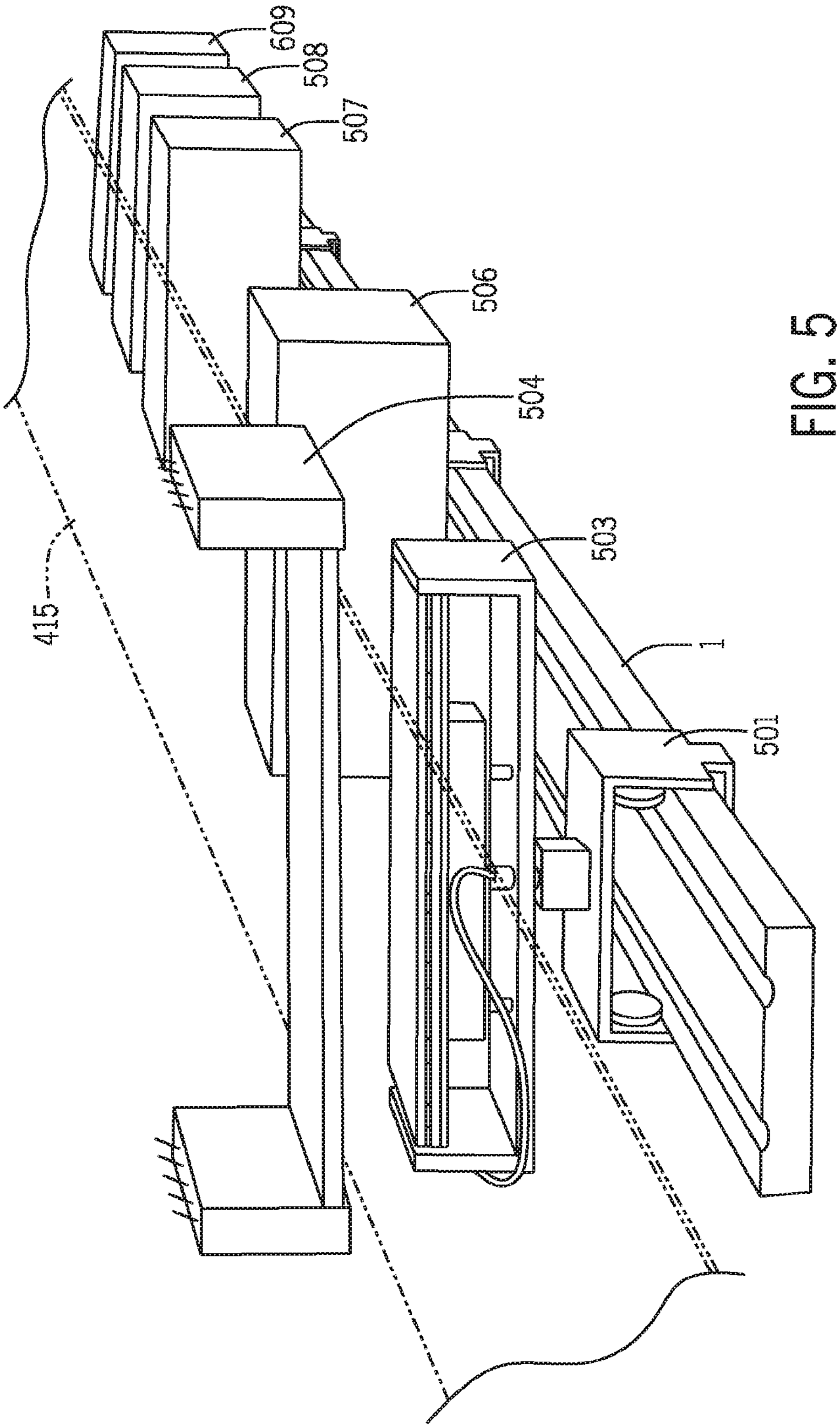
FIG. 5 is a diagram of a system for converting.

FIG. 5 shows an embodiment where a stationary bar 504 is heated and an operating station operating 503 carried by a sled 501 pushes web or film 415 up against bar 504 to heat web 415. Sled 501 and operating stations 506-509 are carried on track 501, which could be linear or a closed loop. Alternatives provide that bar 504 is a backing and operating station 503 includes a heated bar.

Figure 6:
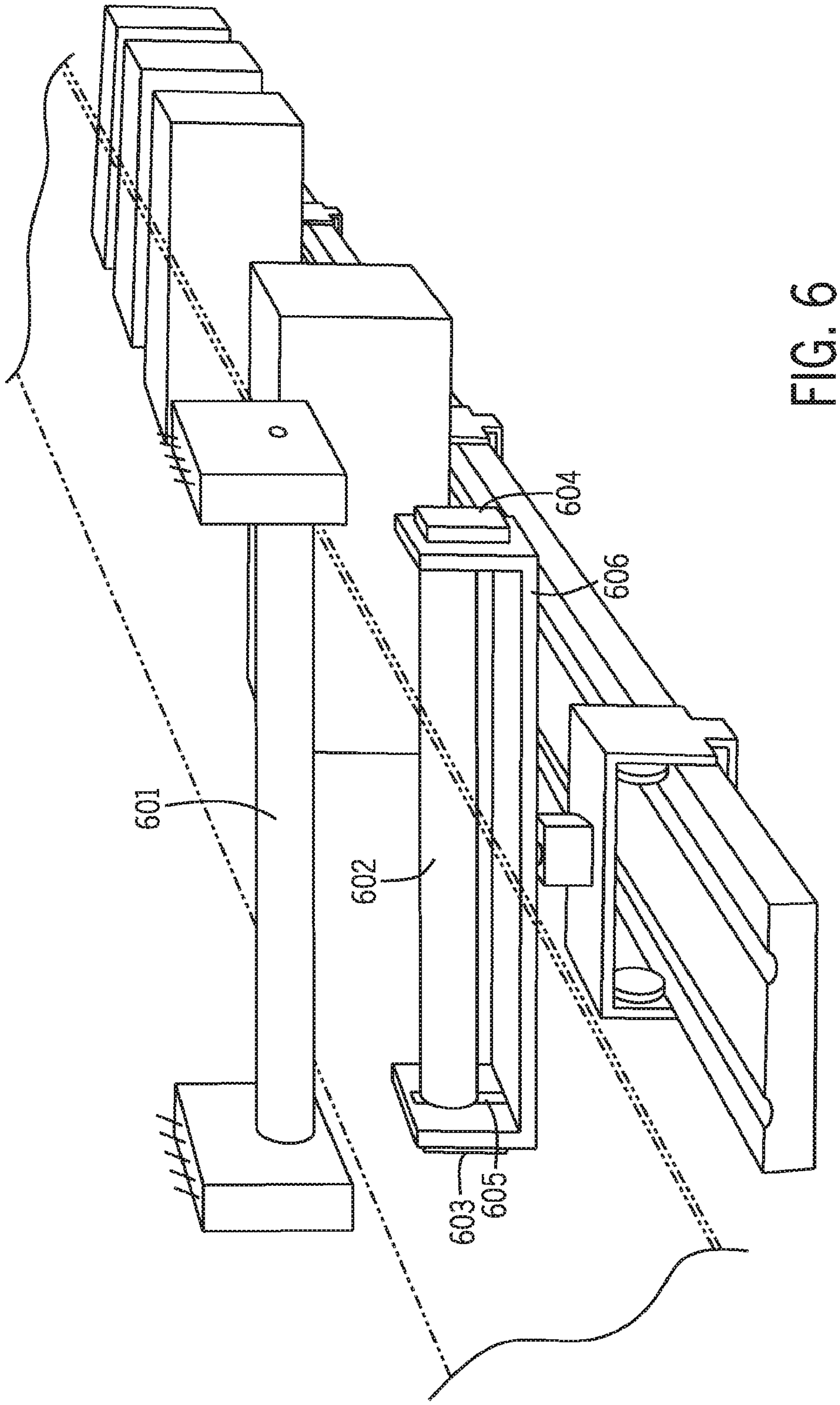
FIG. 6 is a diagram of a system for converting.

FIG. 6 shows an embodiment where a roller 601 has a fixed position relative to the frame or base of the machine. Roller 602 is part of an operating station 606, and interacts with roller 601, and can provide rolling action at the same or different linear speeds, relative to the web or film speed. This embodiment can include using the sleds to automatically position the appropriate tools at the appropriate location (in this case to cooperate with roller 601) for the particular pouch or product that is desired. The operator could then change from one size of pouches to another, or change recipes as is often described in this industry, a sled with an appropriate tool would relocate to work with roller 601. Control line 603 and controller 604 actuate, control, process, detect, or manage the physical relationships of roller 602 relative to roller 601. A guiding system 605 may have none or a plurality of springs, dampers, actuators, and/or sensors. Also the tool may be subject to linear, curvilinear, rocker-type linkage, rotational, or free movement. Roller 601 and 602 may form an ultrasonic sealer that form a pouch that is cut by downstream tools, or roller 602 can include a dies that cuts a sealed pouch. Roller 602 can be a heated bar that forms a seal, and can extend continuously and completely across the web, partially across the web, or intermittently across the web to form seals as desired.

The orientation of this invention could be horizontal, vertical, angled, or sideways—any orientation is possible. The preferred embodiment is horizontal, if replacing a pouch making machine with many of the basic and current value added operations. However, this invention could be set up in a vertical format, where the web is traveling up-and/or-down so that when the web is cut into discrete bags or pouches, those bags are pouches could be moved or pushed to opposing directions. Some machinery history has referred to these as Wig-warn or zig-zag mechanisms. The benefit of a system like this, would improve the ability to stack two separate piles during the processing of the web. In some configurations, this is advantageous for reducing the amount of human intervention or need to package and process the finished pouches or bags. The system is also sometimes used as a zipper eccentric system.

In the processes for making a trash bag, or certain types of pouches, particularly where continuous motion is desired, it may be advantageous to have a circular or nonlinear track such as that shown in FIG. 3 for the sleds to travel in. An example of a commercially available closed loop track or linear track is Itrak®.

Numerous modifications may be made to the present disclosure which still fall within the intended scope hereof. Thus, it should be apparent that there has been provided a method and apparatus for a method and machine for making bags or pouches or converting a web or film that fully satisfies the objectives and advantages set forth above. Although the disclosure has been described specific embodiments thereof, it is evident that many alternatives, modifications and variations will be apparent to those skilled in the art. Accordingly, the invention is intended to embrace all such alternatives, modifications and variations that fall within the spirit and broad scope of the appended claims.

What is claimed is:

1. A machine configured to form a plurality of pouches or bags in a film, the machine comprising:

a track;

a first sled that is movable along the track;

a first frame mounted to the sled such that the first frame moves with the first sled along the track, the first frame encircles a passageway configured to permit passage of the film therethrough;

a web processing tool located within the passageway and configured to perform an operation on the film to thereby at least partially form a pouch or bag of the plurality of pouches or bags in the film;

wherein the first frame and the web processing tool are positioned vertically above the first sled;

wherein the web processing tool, the first frame, and the first sled linearly move along the track and with the film as the web processing tool performs the operation on the film; and wherein the first sled linearly moves back to a starting position after the web processing tool performs the operation on the film such that the web processing tool can perform another operation on another segment of the film;

a second sled that is movable along the track and spaced apart from the first sled; and a second frame mounted to the second sled such that the second frame moves with the second sled along the track, the second frame encircles a passageway configured to permit passage of the film therethrough and a second web processing tool within the passageway of the second frame is configured to perform a second operation on the film as the second frame moves with the sled; and wherein the passageway of the second frame is aligned with the passageway of the first frame such that the film is passed through both passageways.

2. The machine according to claim 1, wherein the first frame has a fixed end coupled to the first sled and an opposite free end oriented away from the first sled.

3. The machine according to claim 1, wherein the web processing tool includes a first component and an opposing second component within the passageway; and wherein at least one of the first component and the second component move relative to the frame and the film to thereby perform the operation on the film.

4. The machine according to claim 3, wherein the first component and the second component are configured to clamp onto the film to thereby perform the operation on the film.

5. The machine according to claim 4, wherein the first component is a first seal bar and the second component is a second seal bar.

6. A machine configured to form a plurality of pouches or bags in a film, the machine comprising:

a track;

a first sled that is movable along the track;

a first frame mounted to the first sled such that the first frame moves with the first sled along the track, the first frame encircles a passageway and the first frame is configured to permit axial passage of the film through the passageway; and a web processing tool coupled to the first frame and positioned within the passageway, wherein the web processing tool is configured to perform an operation on the film to at least partially form a pouch or bag of the plurality of pouches or bags in the film;

wherein the first frame and the web processing tool are positioned vertically above the first sled;

wherein the web processing tool, the first frame, and the first sled linearly move along the track and with the film as the web processing tool performs the operation on the film;

wherein the sled linearly moves back to a starting position after the web processing tool performs the operation on the film such that the web processing tool can perform another operation on another segment of the film;

a second sled that is movable along the track and spaced apart from the first sled; and a second frame mounted to the second sled such that the second frame moves with the second sled along the track, the second frame encircles a passageway configured to permit passage of the film therethrough and a second web processing tool within the passageway of the second frame is configured to perform a second operation on the film as the second frame moves with the sled; and wherein the passageway of the second frame is aligned with the passageway of the first frame such that the film is passed through both passageways.

7. The machine according to claim 6, wherein the first frame has a fixed end coupled to the sled and an opposite free end oriented away from the sled.

8. The machine according to claim 7, wherein the first sled is vertically supported on the track.

9. The machine according to claim 8, wherein the first sled has a pair of arms that hold the first sled on the track.

10. The machine according to claim 6, wherein the web processing tool comprises a sealer, a heater, a cooler, an inserter, a knife, a punch, a perforator, a static charger, or a printer.

* * * * *